United States Patent
Robinson et al.

(10) Patent No.: US 10,592,088 B2
(45) Date of Patent: *Mar. 17, 2020

(54) HOME SCREEN FOR WEARABLE DEVICE

(71) Applicant: Verizon Patent and Licensing Inc., Arlington, VA (US)

(72) Inventors: Quentin N. Robinson, Willingboro, NJ (US); Ai Mitsufuji, Mountain View, CA (US); Layton R. Diament, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,652

(22) Filed: Jun. 18, 2019

(65) Prior Publication Data

US 2019/0302995 A1 Oct. 3, 2019

Related U.S. Application Data

(63) Continuation of application No. 14/854,524, filed on Sep. 15, 2015, now Pat. No. 10,365,811.

(51) Int. Cl.
*G06F 3/0484* (2013.01)
*G06F 3/0482* (2013.01)
*G06F 3/0481* (2013.01)
*G06F 3/0488* (2013.01)
*G06F 1/16* (2006.01)
(Continued)

(52) U.S. Cl.
CPC ....... *G06F 3/04847* (2013.01); *G04G 9/0064* (2013.01); *G06F 1/163* (2013.01); *G06F 1/169* (2013.01); *G06F 3/03547* (2013.01); *G06F 3/0482* (2013.01); *G06F 3/0488* (2013.01); *G06F 3/04817* (2013.01); *G06F 3/04883* (2013.01); *G04G 21/00* (2013.01); *G06F 2203/0339* (2013.01)

(58) Field of Classification Search
CPC ............ G06F 3/04847; G06F 3/03547; G06F 3/04817; G06F 3/0482; G06F 3/0488; G06F 3/04883; G06F 1/163; G06F 1/169; G06F 2203/0339; G04G 21/00
See application file for complete search history.

(56) References Cited

U.S. PATENT DOCUMENTS

| 8,874,162 B2 | 10/2014 | Schrader et al. |
| 2012/0095979 A1 | 4/2012 | Aftab et al. |

(Continued)

*Primary Examiner* — Andrew T Chiusano

(57) ABSTRACT

A wearable device receives user configuration data that provides user-specific information for stored use cases and generates a personalized use case database based on the stored use cases and the user-specific information. The wearable device obtains location, sensor, time, and peripheral state data and detects a meaningful change in a most recent data instance of the location, sensor, time, or peripheral state data over an earlier data instance of the location, sensor, time, and peripheral state data. The wearable device determines if the most recent data instance corresponds to a particular use case in the personalized use case database; presents on a display a new home-screen experience, including multiple application user interfaces for the particular use case, when the most recent data instance corresponds to the particular use case; and changes a hardware state to enable use of the multiple application user interfaces in the new home-screen experience.

20 Claims, 12 Drawing Sheets

(51) Int. Cl.
*G06F 3/0354* (2013.01)
*G04G 9/00* (2006.01)
*G04G 21/00* (2010.01)

(56) References Cited

U.S. PATENT DOCUMENTS

| | | |
|---|---|---|
| 2014/0052681 A1 | 2/2014 | Nitz et al. |
| 2014/0100835 A1 | 4/2014 | Majumdar et al. |
| 2014/0201655 A1 | 7/2014 | Mahaffey et al. |
| 2015/0046828 A1 | 2/2015 | Desai et al. |
| 2015/0268782 A1 | 9/2015 | Kim et al. |
| 2016/0179353 A1 | 6/2016 | Iskander |
| 2016/0198319 A1 | 7/2016 | Huang et al. |
| 2016/0198322 A1 | 7/2016 | Pitis |
| 2016/0360382 A1 | 12/2016 | Gross et al. |
| 2017/0039480 A1 | 2/2017 | Bitran et al. |
| 2017/0242805 A1 | 8/2017 | Nietner et al. |
| 2017/0329511 A1 | 11/2017 | Ueno et al. |

HOME SCREEN FOR WEARABLE DEVICE

CROSS REFERENCE TO RELATED APPLICATION

This application is a continuation of U.S. patent application Ser. No. 14/854,524 filed on Sep. 15, 2015, the disclosure of which is hereby incorporated by reference.

BACKGROUND

Wearable computing devices (or simply wearable devices), such as a smart watch, provide convenient access to certain communication and computing features. In some cases, the wearable device may run applications (or limited versions of applications) that are typically found on larger mobile devices. Due to their comparatively small form factor, meaningful use cases for wearable devices have been elusive in today's market.

DETAILED DESCRIPTION OF PREFERRED EMBODIMENTS

The following detailed description refers to the accompanying drawings. The same reference numbers in different drawings may identify the same or similar elements.

Systems and methods described herein may provide a dynamic home screen experience for a wearable computing device (referred to herein simply as a "wearable device"). The wearable device may present a limited number of icons pertaining to applications on the wearable device and will vary the presentation of particular icons depending on a detected use case. The wearable device will also update the hardware state of the wearable device to support use of the currently-presented applications. Use-cases may be preprogrammed or created/edited by a user of the wearable device. A contextual engine in the wearable device pulls data from several different sources and analyzes the current state of the wearable device, and based on the analysis, calculates whether the user's context is important at the time. When the context is found to be relevant, the home screen and hardware of the wearable device is changed and/or engaged.

Figure 1:
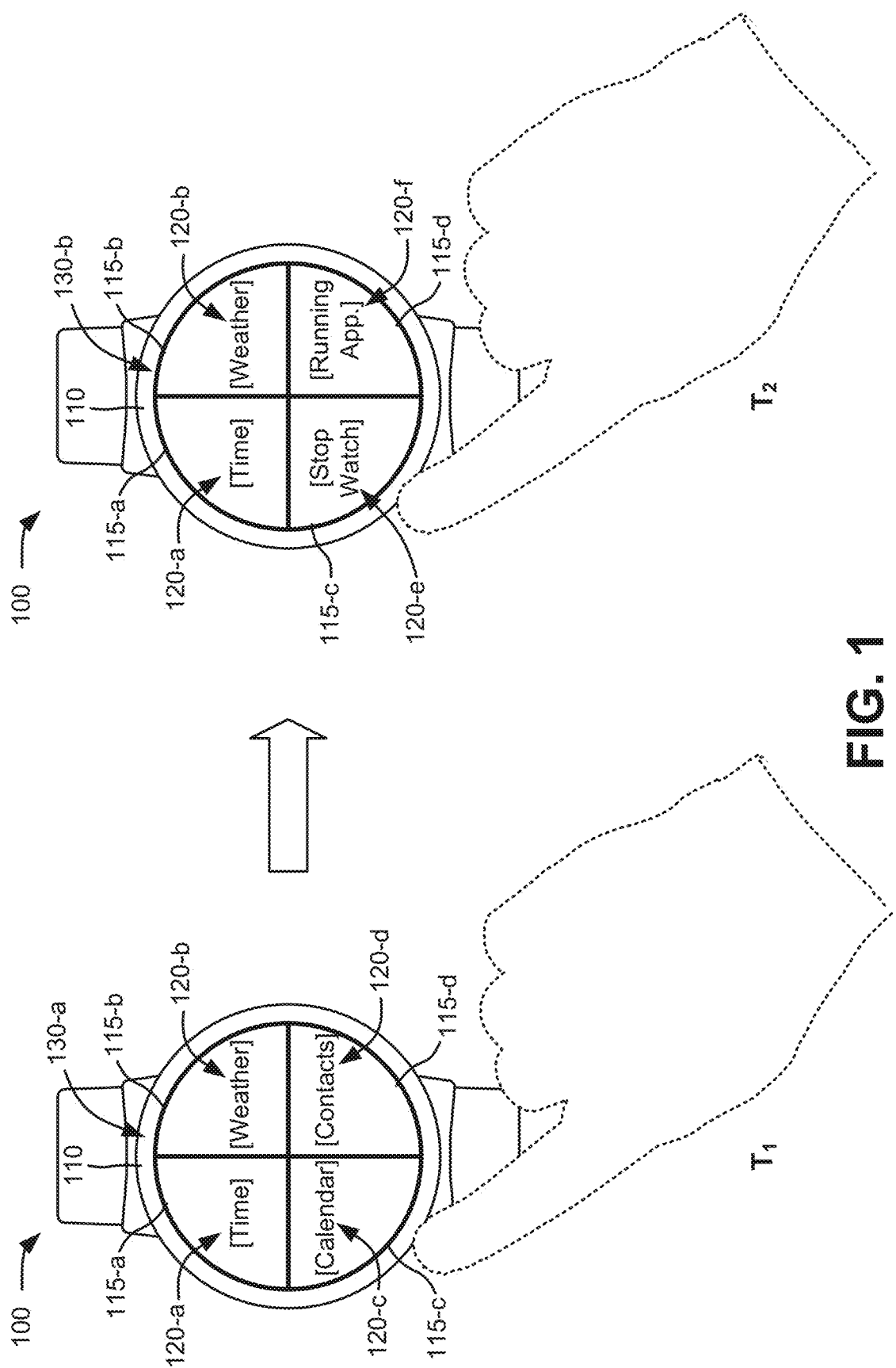
FIG. 1 is a diagram illustrating an implementation described herein.

FIG. 1 is a diagram illustrating an implementation described herein. As shown in FIG. 1, a wearable device 100, such as a smart phone or computer pendant, includes a display screen 110. Display screen 110 may include a relatively small form factor that is divided into portions 115-a through 115-d (referred to collectively as "portions 115" and individually as "portion 115"). Display screen 110 may include a touch-sensitive panel (e.g., capacitive, resistive, etc.) that can receive user input. Although four portions 115-a through 115-d are shown in FIG. 1, in other implementations additional or fewer portions 115 may be included in display screen 110. The area of portions 115 may be limited by, for example, the number of portions 115 that can fit on display screen 110 of a particular size and given a minimum required touch size of a human finger or other instrument.

Each of portions 115 may present a user interface for a particular application (also referred to as an "application user interface"). In one implementation, an application user interface may be implemented by one of icons 120-a through 120-f (referred to collectively as "icons 120" and individually as "icon 120"). Different icons 120 may be presented in portions 115 at different times or contexts. Particularly, in the example of FIG. 1, display screen 110 may present, at a time, $T_1$, icons 120-a, 120-b, 120-c, and 120-d in portions 115-a, 115-b, 115-c, and 115-d, respectively. Selection by a user of one of portions 115 with data driven icons 120 may cause wearable device 100 to alter the presentation of display screen 110, so as to provide additional information relating to a corresponding application for the selection icon 120.

A grouping of a particular combination of icons 120 in the portions 115 of display screen 110 and the underlying hardware configuration to support each user interface may be referred to herein as a home-screen experience 130 (or simply "experience 130"). In the example of FIG. 1, icons 120-a, 120-b, 120-c, and 120-d may represent a home-screen experience 130-a at time $T_1$. Home-screen experiences 130 may provide easier access to icons 120 that are most likely of interest to a particular user in a particular use case or context (e.g., for a particular time of day, location, activity, etc.). In some implementations, one or more of icons 120 may include data-driven icons that reflect changing information, which may be obtained from a corresponding application in wearable device 100. According to implementations described herein, wearable device 100 may detect location information, internal sensor data, times, and peripheral states to determine a particular use case or context for wearable device 100. Wearable device 100 may then present, on display screen 110, a particular experience 130 that corresponds to the current use case.

For example, as shown in FIG. 1, at time, $T_1$, wearable device 100 may present home-screen experience 130-a which includes icons 120-a, 120-b, 120-c, and 120-d in portions 115-a, 115-b, 115-c, and 115-d, respectively. At a later time, T2, wearable device 100 may detect a change in location, sensor data, time, and/or a peripheral state. Wearable device 100 may determine if the change(s) are meaningful and if the changes are indicative of a new use case. Assuming a new use case is detected, wearable device 100 may change the home-screen experience 130 of display screen 110 to match the newly detected use case. Thus, as shown in FIG. 1, wearable device 100 may, at time T2, present home-screen experience 130-b which includes icons 120-a, 120-d, 120-e, and 120-f in portions 115-a, 115-b, 115-c, and 115-d, respectively.

Figure 2:
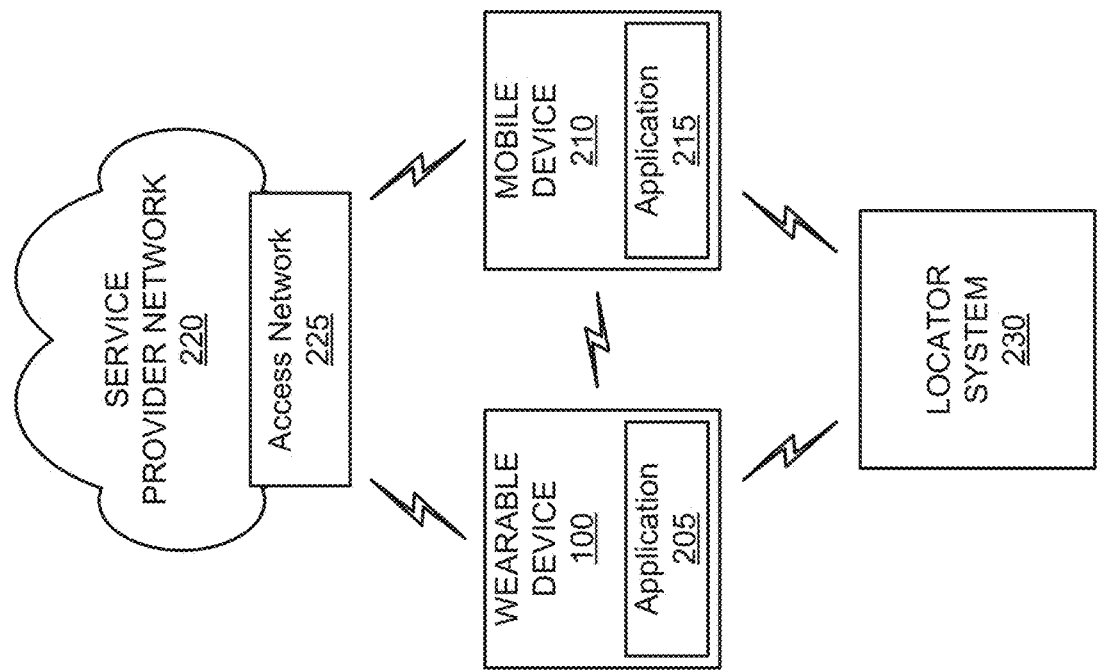
FIG. 2 is a diagram illustrating an exemplary network in which systems and/or methods described herein may be implemented.

FIG. 2 is a diagram illustrating an exemplary network environment 200 in which systems and methods described herein may be implemented. As illustrated, network environment 200 may include wearable device 100, a user device 210, a service provider network 220, and a locator system 230. Components of network environment 200 may be connected via wired and/or wireless links.

Wearable device 100 may include a communication and computational device. For example, wearable device 100 may include a smart watch, a fitness tracker, or another device that may be worn or otherwise coupled to a user. Wearable device 100 may take the form of a wristband-mounted device (like a wristwatch) or another wearable form factor, such as a pendant style device configured for wearing via a chain or lanyard, a brooch or other pin-on or clip-on on style device, an armband-mounted device, etc. Wearable device 100 may include one or multiple applications 205 which may be executed on wearable device 100 to perform particular functions, such as communications (e.g., texts, emails, voice), information (e.g., weather, news, sports), monitoring (e.g., movements, vital signs, etc.), and other functions. As described further herein, wearable device 100 may include a motion sensor, such as an accelerometer, a gyroscope, etc. that determines information regarding a movement of wearable device 100. Additionally, the motion sensor may detect a position and/or motion of an object or a person (e.g., a user of wearable device 100) attached to and/or otherwise monitored by wearable device 100. For example, wearable device 100 may include a location sensor, such as a sensor to receive global positioning system (GPS) data or other location data from locator system 230, or a component to dynamically determine a location of wearable device 100 (e.g., by processing and triangulating data/communication signals received from one or more base stations). Wearable device 100 may further compare sensor data to determine whether a particular use case has occurred.

Mobile device 210 may include a portable communication device (e.g., a mobile phone, a smart phone, a phablet device, a global positioning system (GPS) device, and/or another type of wireless device); a laptop (e.g., with a wireless air card), a tablet, or another type of portable computer; a media playing device; a portable gaming system; and/or any other type of mobile computer device with communication and output capabilities (e.g., an infotainment system in a vehicle, etc.). In one implementation, mobile device 210 may be provided with one or more applications 215 (e.g., a configuration application) to configure and/or monitor wearable device 100.

Wearable device 100 and mobile device 210 may further include a short range wireless networking interface, such as a Bluetooth® wireless interface, a radio-frequency identification (RFID) interface, a near-field communications (NFC) wireless interface, infra-red (IR) communications interface, and/or any other type of interface to exchanges data. Additionally or alternatively, wearable device 100 and mobile device 210 may be connected via a physical connection, such as a universal serial bus (USB) or a Lightning Wire® cable. In one implementation, mobile device 210 may include one or more sensors to capture additional information regarding a user or a surrounding environment for wearable device 100. In some cases, mobile device 210 may further compare sensor data to determine whether a particular use case for wearable device 100 has occurred. For example, mobile device 210 may include a location sensor, such as a sensor to receive a GPS or other location data, or a component to dynamically determine a location of mobile device 210.

Service provider network 220 may include network devices that provide telecommunications services and provide a backend support system for supporting features of wearable devices 100. Service provider network 220 may include a local area network (LAN), an intranet, a private wide area network (WAN), a telephone network, such as the Public Switched Telephone Network (PSTN), a metropolitan area network (MAN), a public network, a mobile access network, a mesh network, a fiber-optics network (e.g., passive optical networks (PONS)), or a combination of networks. Service provider network 220 may include, for example, one or more private Internet Protocol (IP) networks that use a private IP address space. Although shown as a single element in FIG. 2, service provider network 220 may include a number of separate networks. Service provider network 220 may permit wearable device 100 to download widgets and/or applications (e.g., corresponding to data-driven icons 120). Service provider network 220 may also permit user device 210 to download application 215 to enable configuration and implementation of widgets/applications for wearable device 100. According to an implementation, service provider network 220 may include a mobile access network 225 that transfers/receives information (e.g., voice, data, broadband applications, etc.) to/from a circuit-switched and/or packet-switched network. As an example, mobile access network 225 may include a long-term evolution (LTE) network, a Code Division Multiple Access (CDMA) network, a Wi-Fi network (e.g., using IEEE 802.11 standards), or other access networks (e.g., an E-UTRAN, an enhanced high-rate packet data (eHRPD) network, or another 3G, 4G, or future wireless network standard).

Locator system 230 may include a satellite global positioning system (GPS), a cellular tower triangulation system, a WLAN access point locating system, a global navigation satellite system (GNSS), or another system that determines real-time (or near real-time) location information for subscribing devices, such as wearable device 100 or mobile device 210. In one implementation, locator system 230 may include a satellite to broadcast information to wearable device 100/mobile device 210. In another implementation locator system 230 may include one or more other systems (e.g., a location information server) to gather/provide information about the position, direction, and/or destination of wearable devices 100/mobile device 210.

In FIG. 2, the particular arrangement and number of components of network environment 200 are illustrated for simplicity. In practice there may be more wearable devices 100, mobile devices 210, service provider networks 220, and GPS devices 230. For example, there may be thousands of wearable devices 100 and/or mobile devices 210.

Figure 3:
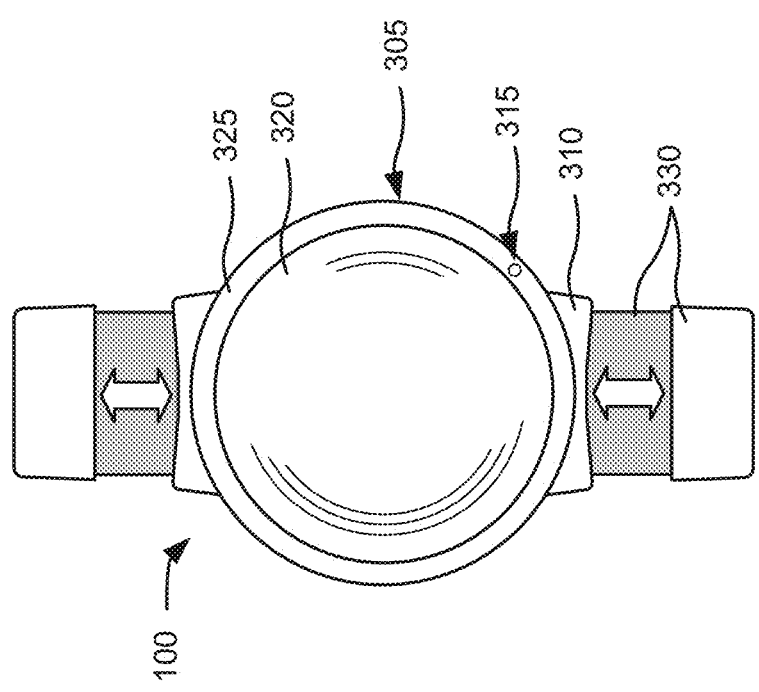
FIG. 3 is a diagram illustrating an exemplary wearable device of FIG. 1.

FIG. 3 is a diagram of an exemplary wearable device 100. As illustrated in FIG. 3, wearable device 100 may include a housing 305 with one or more anchor points 310, a speaker 315, a display screen 320, a touch-sensitive edge 325, and a band 330.

Housing 305 may include a structure to contain components of wearable device 100. For example, housing 305 may be formed from plastic, metal, or some other material. Housing 305 may support anchor points 310, speaker 315, display 320, touch-sensitive edge 325, and other components (not shown in FIG. 3).

Anchor points 310 may be integrated with or attached to housing 305 and may provide a mounting surface to which a band (e.g., band 330) may be secured. In some implementations, pins or other mechanisms may be used to secure band 330 to anchor points 310. In another implementation, band 330 may be configured to clip or snap into anchor points 310.

Speaker 315 may include an output device that converts an electrical signal to a corresponding sound wave. For example, wearable device 100 may generate a tone or other auditory signals through speaker 215 to provide an alarm, indication, cue tone, etc.

Display screen 320 may correspond to display screen 110 of FIG. 1. Display screen 320 may provide visual information to the user. For example, display screen 320 may display text, images, video, and/or graphics received from another device, and/or information regarding incoming or outgoing calls or text messages, emails, media, games, phone books, address books, the current time, etc. For example, display screen 320 may include a liquid crystal display (LCD), such as a thin film transistor (TFT) LCD, etc. In one implementation, display screen 320 may include a touch screen display that may be configured to receive a user input when the user touches (or comes in close proximity to) display screen 320. For example, the user may provide an input to display screen 320 directly, such as via the user's finger, or via other instruments, such as a stylus. User inputs received via display screen 320 may be processed by components and/or devices operating in wearable device 100. The touch-screen-enabled display screen 320 may permit the user to interact with wearable device 100 in order to cause wearable device 100 to perform one or more operations. Exemplary technologies to implement a touch screen on display screen 320 may include, for example, a near-field-sensitive (e.g., capacitive) overlay, an acoustically-sensitive (e.g., surface acoustic wave) overlay, a photo-sensitive (e.g., infra-red) overlay, a pressure sensitive (e.g., resistive) overlay, and/or any other type of touch panel overlay that allows display screen 320 to be used as an input device. The touch-screen-enabled display screen 320 may also include the ability to identify movement of a body part or a pointing device as it moves on or near the surface of the touch-screen-enabled display screen 320.

In one implementation, housing 305 may include a touch-sensitive edge 325. Touch-sensitive edge 325 may be included as a separate touch input component from display screen 320 or may be included as part of display screen 320. Touch-sensitive edge 325 may detect motion (e.g., a swiping motion along a circumference of display screen 320) as a form of user input.

Band 330 may include a wristband, armband, lanyard, or other form of attachment to secure wearable device 100 to a body part or clothing. In some instances band 330 may include sensors and communication components. In other instances, band 330 may be interchangeable with a peripheral device, such as a fitness band, that operates separately from wearable device 100 and is communicatively coupled (as well as physically connected) to wearable device 100.

Although FIG. 3 shows example components of wearable device 100, in other implementations, wearable device 100 may contain fewer components, different components, differently-arranged components, or additional components than depicted in FIG. 3. Alternatively, or additionally, one or more components of wearable device 100 may perform one or more other tasks described as being performed by one or more other components of wearable device 100. For example, in addition to display screen 320, touch user input may also be received on other portions of housing 305 in some implementations.

Figure 4:
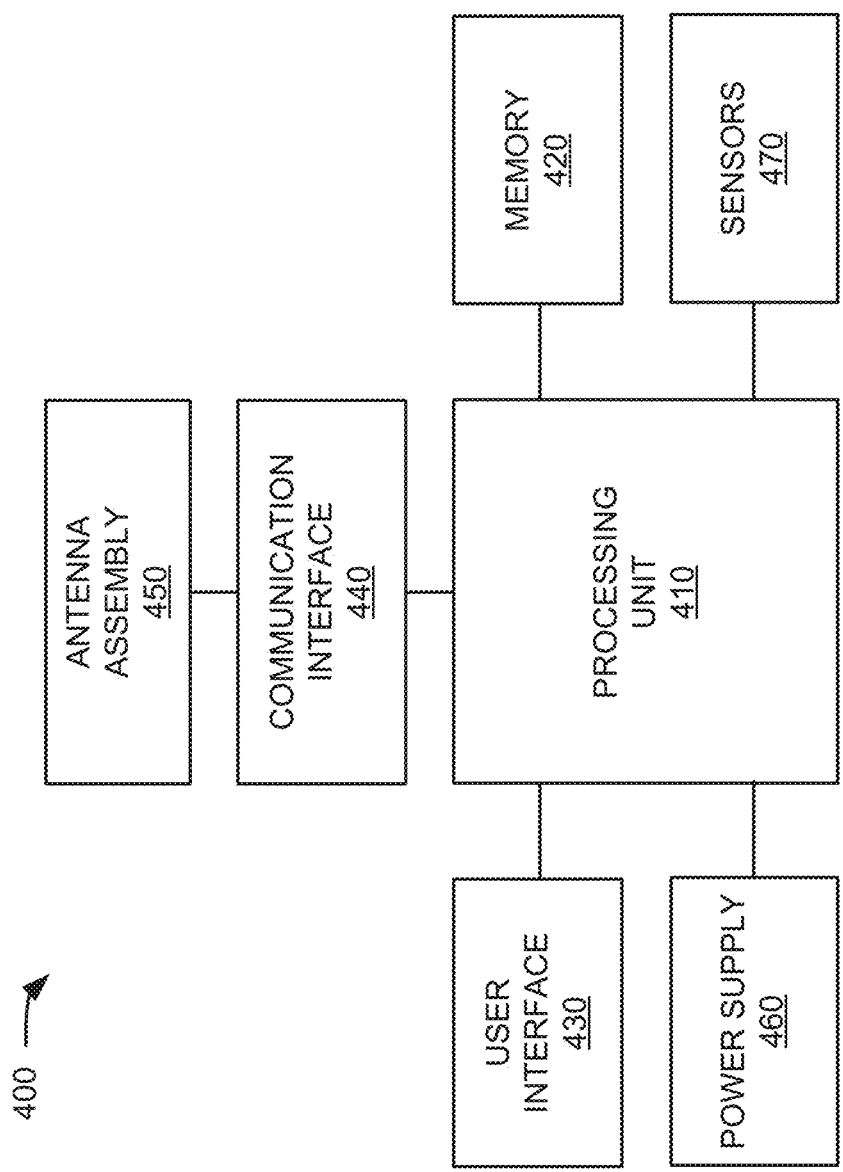
FIG. 4 is a block diagram illustrating exemplary components of a device that may correspond to a wearable device or a mobile device of FIG. 2.

FIG. 4 is a diagram illustrating exemplary components of a device 400, according to an implementation described herein. Each of wearable device 100 and mobile device 210 may be implemented as a combination of hardware and software on one or more of device 400. As shown in FIG. 4, device 400 may include a processing unit 410, a memory 420, a user interface 430, a communication interface 440, an antenna assembly 450, a power supply 460, and sensors 470.

Processing unit 410 may include one or more processors, microprocessors, application specific integrated circuits (ASICs), field programmable gate arrays (FPGAs), and/or other processing logic. Processing unit 410 may control operation of device 400 and its components.

Memory 420 may include a random access memory (RAM) or another type of dynamic storage device, a read only memory (ROM) or another type of static storage device, a removable memory card, and/or another type of memory to store data and instructions that may be used by processing unit 410.

User interface 430 may allow a user to input information to device 400 and/or to output information from device 400. Examples of user interface 430 may include a speaker (e.g., speaker 315) to receive electrical signals and output audio signals; a camera to receive image and/or video signals and output electrical signals; a microphone to receive sounds and output electrical signals; buttons (e.g., a joystick, control buttons, a keyboard, a touchscreen, or keys of a keypad) to receive control commands; a display (e.g., display screen 320) to output visual information and receive touch input; an actuator to cause device 400 to vibrate; a sensor; and/or any other type of input or output device. When device 400 is a wearable device 100, user interface 400 may include limited input and output options. For example, a wearable device 100 may include a speaker, a microphone, and a touch screen to present and access an application 215 or widget.

Communication interface 440 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 440 may include a transmitter that converts baseband signals to radio frequency (RF) signals and/or a receiver that converts RF signals to baseband signals. Communication interface 440 may be coupled to antenna assembly 450 for transmitting and receiving RF signals.

Communication interface 440 may include a logical component that includes input and/or output ports, input and/or output systems, and/or other input and output components that facilitate the transmission of data to other devices or peripherals. For example, communication interface 440 may include a network interfaces for wired communications and/or a wireless network interfaces (e.g., Wi-Fi) for wireless communications. Communication interface 440 may also include a universal serial bus (USB) port for communications over a cable, a Bluetooth™ wireless interface, a radio-frequency identification (RFID) interface, an NFC wireless interface, and/or any other type of interface that converts data from one form to another form.

Antenna assembly 450 may include one or more antennas to transmit and/or receive RF signals. Antenna assembly 450 may, for example, receive RF signals from communication interface 440 and transmit the signals via an antenna and receive RF signals from an antenna and provide them to communication interface 440.

Power supply 460 may include one or more batteries or other portable power source components used to supply power to components of device 400. Power supply 460 may also include control logic to control application of power from an external power source (e.g., a charger) to one or more components of device 400.

Sensors 470 may include various sensors such as an accelerometer, a gyroscope, a barometer, and/or a heart rate monitor. Sensors 470 may detect attributes or environments of wearable device 100 and provide sensor readings to processing unit 410 at various intervals or upon request. In one implementation, wearable device 100 may store movement patterns associated with a movement of wearable device 100 as detected by sensors 470. For example, a movement pattern may identify one or more motion directions, motion velocities, motion durations, etc. associated with a movement for a particular use case (e.g., an exercise or fitness activity). Wearable device 100 may compare detected motions to the stored movement patterns, and wearable device 100 may determine that a particular exercise occurred when the detected motion corresponds to a motion pattern of a known use case. In another example, wearable device 100 may include or interface with a peripheral sensor device, such as a fitness monitor, that identifies attributes of a user, such as the user's heart rate, body temperature, respiration rate, etc.

As described herein, device 400 may perform certain operations in response to processing unit 410 executing software instructions contained in a computer-readable medium, such as memory 420. A computer-readable medium may be defined as a non-transitory memory device. A non-transitory memory device may include memory space within a single physical memory device or spread across multiple physical memory devices. The software instructions may be read into memory 420 from another computer-readable medium or from another device via communication interface 440. The software instructions contained in memory 420 may cause processing unit 410 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 4 shows examplary components of device 400, in other implementations, device 400 may include fewer components, different components, differently-arranged components, or additional components than those depicted in FIG. 4. Additionally or alternatively, one or more components of device 400 may perform the tasks described as being performed by one or more other components of device 400.

Figure 5:
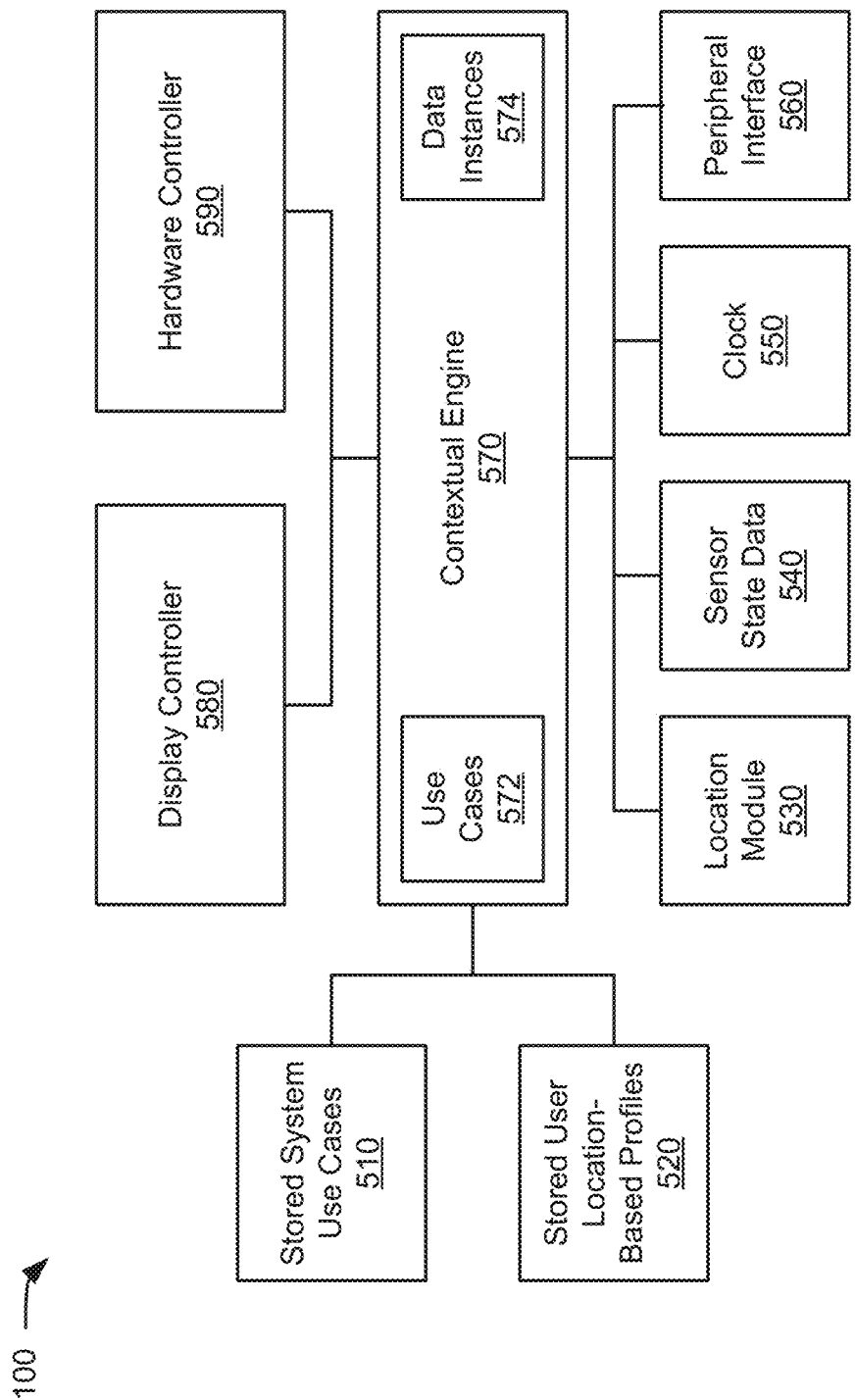
FIG. 5 is a block diagram illustrating exemplary functional components of the wearable device of FIG. 1.

FIG. 5 is a block diagram illustrating exemplary functional components of wearable device 100. The functional components of FIG. 5 may be implemented, for example, by processing unit 410 in conjunction with memory 420. As shown in FIG. 5, wearable device 100 may include stored system use cases 510, stored user location-based profiles 520, a location module 530, sensor state data 540, a clock 550, peripherals 560, a contextual engine 570, a touch screen controller 580, and a hardware controller 590.

Stored system use cases 510 may include pre-programmed use-case definitions that are used to trigger presentation of a particular home-screen experience 130 on wearable device 100. For example, a work profile definition or a home profile definition may include a location definition and a default set of icons 120 to be presented in portions 115. An evening profile may include a definition requiring a time of day and a location (e.g., a location that differs from a home profile location) and a different set of icons 120 to be presented in portions 115. A fitness profile may include a time of day, a location, and/or sensor data indicating particular types of motions. In one implementation, stored system use cases 510 may include default values in the definitions to trigger a use case and to determine which icons 120 will be presented in which portion 115.

Stored user location-based profiles 520 may include user settings for definitions in stored system use cases 510. Generally, information from stored user location-based profiles 520 may be used to personalize definitions in stored system use cases 510 so that a desired home-screen experience will be presented to a user for each available use case. For example, a particular user's home location may be stored in stored user location-based profiles 520 and associated with a home home-screen experience 130. A user may associate the home location with a particular set (or a default set) of icons 120. As another example, a local gym or track location may be stored and associated with a fitness home-screen experience 130. In one implementation, wearable device 100 may solicit location and/or sensor data during a user's initial launch of a home-screen experience. For example, wearable device 100 may ask if a user wants to associate a current location with a particular home-screen experience 130 when wearable device 100 is first unboxed and synchronizes with mobile device 210. In another implementation, a corresponding application (e.g., application 215) on mobile device may be used to provide user data for stored user location-based profiles 520.

Location module 530 may be used to identify the location of wearable device 100. Location module 530 may run as a background service that provides location updates at a variable periodicity. Location module 530 may communicate, for example, with locator system 250. Location module 530 may include, for example, GPS functionality, assisted-GPS, or other location-determination technology. Location module 530 may conduct location queries in response to current location requests from contextual engine or application 215 (e.g., when a user is configuring profile settings for a new location). Location module 530 may also conduct periodic location queries (e.g., from locator system 250) to determine the current location of wearable device 100. Location module 530 may provide location information to contextual engine 570 in the form of, for example, GPS coordinates, latitude and longitude coordinates, or other geo-position coordinates.

In one example implementation, location module 530 may rely only on a GPS satellite to determine a location of wearable device 100. In another example implementation, a position determining entity (e.g., a network server) may assist location module 530 in determining GPS coordinates by providing ephemeris data to location module 530 to allow faster identification of satellites within view of wearable device 100 or mobile device 210. For example, upon receiving a location request, location module 530 may communicate with a location-based service infrastructure (e.g., via network 220) and a GPS satellite (e.g., locator system 230) to determine a geographical location of wearable device 100 and/or mobile device 210. Additionally, or alternatively, location module 530 may retrieve location information in the form of cellular tower triangulation information collected from wearable device 100 or mobile device 210. Location module 530 may also retrieve location information in the form of WLAN access point location information. In some implementations, the type of location information obtained by location module 530 may be limited by whether access to a particular network interface (e.g., communication interface 540) of wearable device 100 and/or mobile device 210 is currently enabled.

Sensor state data 540 may include sensor data collected from sensors 470 in hardware 590 and/or sensors in mobile device 210. As described further herein, contextual engine 570 may access sensor state data 540 to determine an applicable home-screen experience 130 for wearable device 100 at a current time.

Clock 550 may record a current time at the location of wearable device 100. In one implementation, clock 550 may receive periodic synchronization updates from network 220 and/or mobile device 210.

Peripheral interface 560 may detect, and/or collect data from, one or more peripherals. A peripheral may include a device that attaches physically or communicatively to wearable device 100. For example, a peripheral may include a fitness band to which wearable device 100 may be attached. In another example, a peripheral may include a wireless interface, such as a dongle, that is connected to a vehicle. Peripherals may provide data, for example, that is not available through sensors in wearable device 100 or mobile device 210, such as particular types of vital signs, vehicle status information, etc.

Contextual engine 570 takes user inputs from stored user location-based profiles 520 and pre-programmed system input from stored system use cases 510 to determine use-cases that are specific to the particular user of wearable device 100. For example, contextual engine 570 may apply stored user location-based profiles 520 to stored system use cases 510 to create a personalized use-case database 572. Contextual engine 570 may receive current data from location module 530, sensor state data 540, clock 550, and peripheral interface 560. In one implementation, contextual engine 570 may receive a set of sensor data, location, time and peripheral states (referred to herein as a "data instance") at an adjustable rate, such as every second, and store the received information as data instances 574. Contextual engine 570 may store a limited number of data instances 574 (e.g., 20, 30, 100, etc. instances) of reported sensor data. Contextual engine 570 may compare new incoming data instances against stored data instances 574 to detect trends or changes. If a meaningful (e.g., statistically significant) change is detected, contextual engine 570 may compare the new data against use case 572 to determine if a new home-screen experience 130 should be activated. For example, contextual engine 570 may determine if a change to home-screen experience 130 and sensor states/refresh rates of wearable device 100 are needed to match a particular use case. As described further in the examples below, each use case may apply to a particular combination of sensors.

Display controller 580 may control display screen 320 to present home-screen experiences 130 based on instructions from contextual engine 570. For example, display controller 580 may present different combinations of icons 120 in different portions 115. Display controller 580 may also present different home screen background colors.

Hardware controller 590 may control hardware, such a sensors 470 and touch screen display 320, in wearable device 100 to implement detection of use cases and presentation of home-screen experiences 130. For example, hardware controller 590 may selectively enable a standard touch screen, enable enhanced touch screen detection for underwater use, disable touch-sensitive edge 325, or disable touch features of display screen 320 to implement different home screen experiences 130. Hardware controller 590 may also activate/deactivate particular sensors 470 and/or control the reporting periodicity (e.g., refresh rates) for data from sensors 470 in different home-screen experiences 130.

Figure 6:
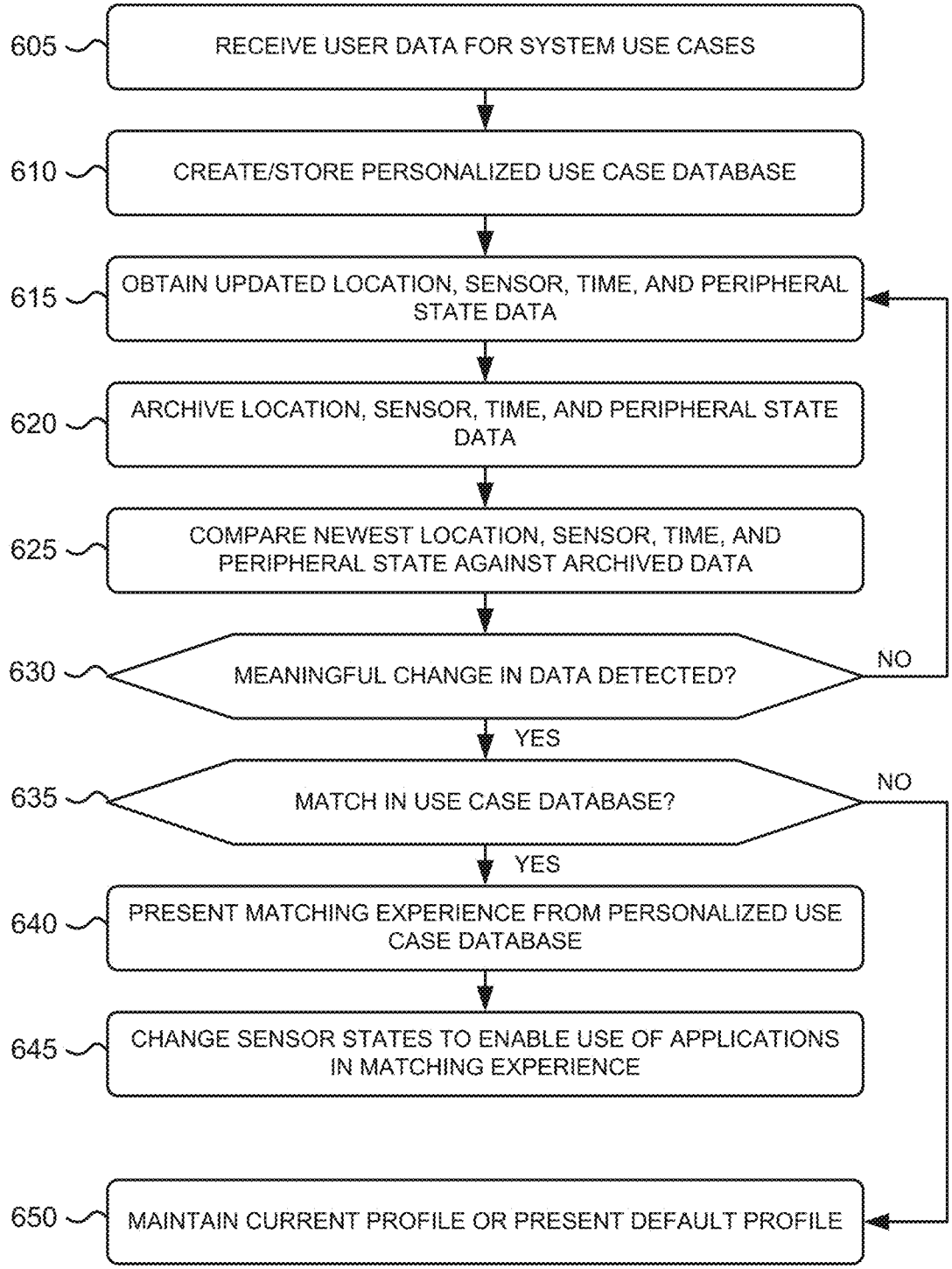
FIG. 6 is a flow diagram illustrating an exemplary process for providing a dynamic home screen for connected wearable devices, according to an implementation described herein.

FIG. 6 is a flow diagram illustrating an exemplary process 600 for implementing a notification service for connected wearable devices according to an implementation described herein. In one implementation, process 600 may be performed by wearable device 100. In another implementation, some or all of process 600 may be performed by wearable device 100 in conjunction with another device or group of devices, such as mobile device 210.

As shown in FIG. 6, process 600 may include receiving user data for system use cases (block 605), and creating and/or storing a personalized use case database (block 610). For example, wearable device 100 may receive user configuration data that provides user-specific information (e.g., stored user location-based profiles 520), such as user-specific locations, times, and other parameters, for stored use cases (e.g., stored system use cases 510) of a wearable computing device. Wearable device 100 (e.g., context engine 570) may generate a personalized use case database (e.g., use cases 572) based on the stored use cases and the user-specific information.

Process 600 may also include obtaining updated location, sensor, time, and peripheral state data (block 615), archiving the location, sensor, time, and peripheral state data (block 620), and comparing the newest location, sensor, time, and peripheral state data against the archived data (block 625). For example, wearable device 100 may obtain location data via location module 530, sensor data via sensor state data 540, time data via clock 550, and peripheral state data via peripheral interface 560. In one implementation, wearable device 100 (e.g., contextual engine 570) may receive a data instance of sensor, location, time and peripheral state data a periodic interval and archive the data instances. Wearable device 100 may compare each new data instance against the previously stored data instances to detect trends or changes.

Process 600 may further include determining if a meaningful change in the data is detected (block 630). For example, wearable device 100 (e.g., contextual engine 570) may determine if data such as a location, motion, time, or peripheral connection state have changed based on a comparison of new and archived data. In some cases, determination of a statistically significant change may be based on a comparison of a newest data instance with an immediately preceding data instance (e.g., detecting whether a peripheral is on or off). In other cases, determination of a statistically significant change may be based on a comparison of a newest data instance with a series of preceding data instances (e.g., a location change over time).

If no meaningful change in the data is detected (block 630—NO), process 600 may return to block 615 to obtain more updated location, sensor, time, and peripheral state data.

If a meaningful change in the data is detected (block 630—YES), process 600 may include determining if there is a match is the use case database (block 635). For example, if a statistically significant change is detected, wearable device 100 (e.g., contextual engine 570) may compare the new data instance against the stored user-specific use-cases (e.g., use cases 572) to determine if a new home-screen experience 130 should be activated.

If there is a match is the use case database (block 635—YES), process 600 may include presenting a matching home-screen experience from the personalized use case database (block 640) and changing the sensor states to enable use of applications in the matching home-screen experience (block 645). For example, wearable device 100 may present on display 320 a new home-screen experience 130, including multiple application user interfaces for a particular use case, when the most recent data instance corresponds to a particular use case in the stored user-specific use-cases (e.g., use cases 572). Wearable device 100 may also change sensor states, such as a increasing a reporting frequency, disabling/enabling a sensor, etc. to support use of the applications 215 (and/or presentation of data-driven icons 120) shown in home-screen experience 130.

If there is not a match in the use case database (block 635—NO), process 600 may include maintaining the current home-screen experience or presenting a default home-screen experience (block 650). For example, if wearable device 100 detects that the latest data instances do not correspond to any of the stored user-specific use-cases (e.g., use cases 572), wearable device 100 may maintain the current home-screen experience 130 until another known use-case is detected. Alternatively, wearable device 100 may switch a default home-screen experience 130 when it detects that the latest data instances do not correspond to the previous home-screen experience 130 or any other stored use cases.

Figure 7:
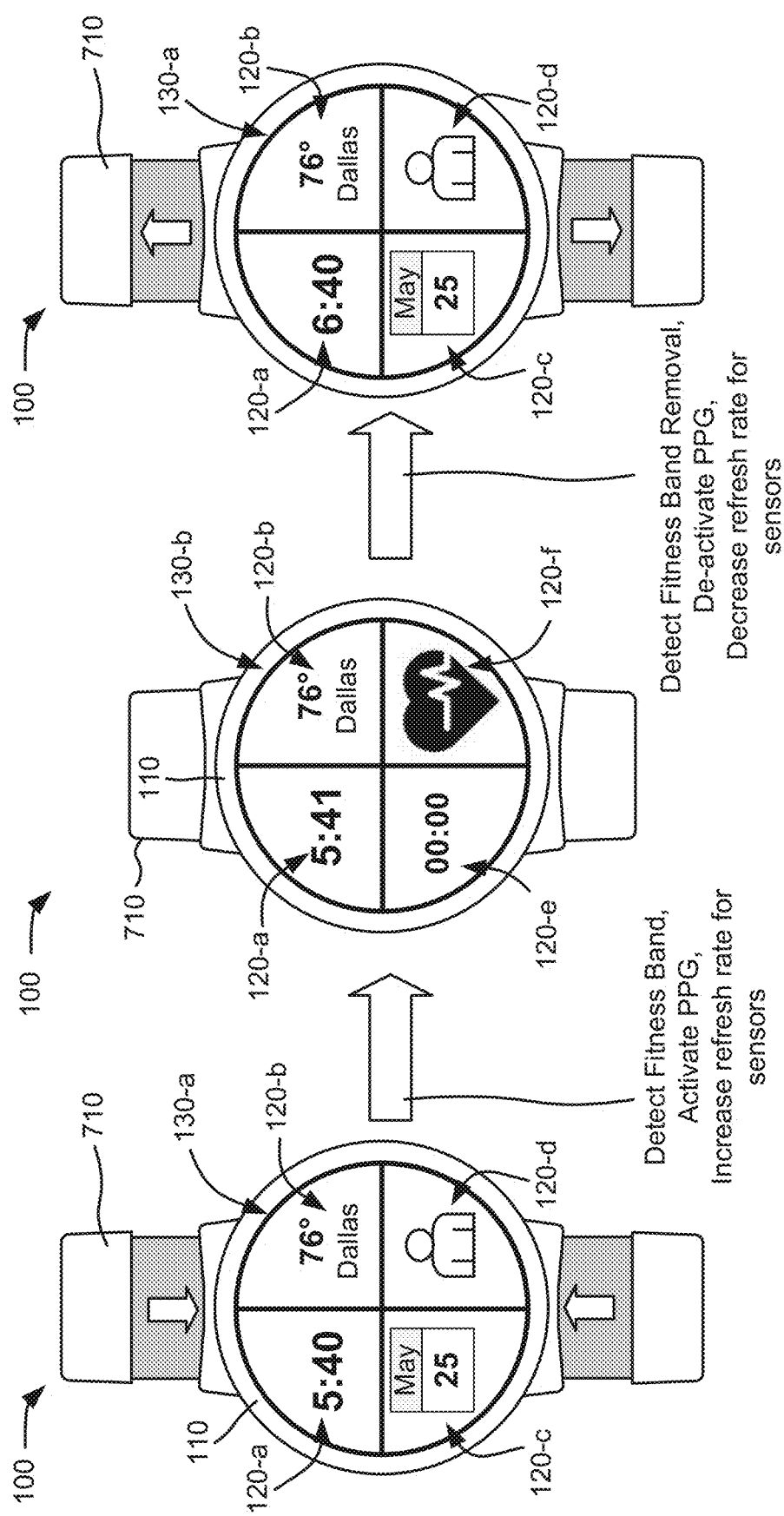
FIGS. 7-12 provide illustrations of use cases for a wearable device according to implementations described herein.

FIG. 7 illustrates a use case for wearable device 100. As shown in FIG. 7, wearable device 100 may be in a default home-screen experience 130-*a* at a time, $T_1$, prior to a fitness peripheral 710 (e.g., a fitness band) being attached to wearable device 100. Once connected, wearable device 100 may detect fitness peripheral 710 at time $T_2$ and may change display 110 to present home-screen experience 130-*b*, reflecting a fitness related use case with icons 120-*e* and 120-*f* presented for easy access to fitness-related applications 215. Wearable device 100 may also change hardware states, such as activating a photoplethysmogram (PPG) along with updating the refresh rate for an accelerometer, gyroscope, magnetometer, or other sensors 470. In one implementation, wearable device 100 may also change a background color of the home screen display (e.g., to better distinguish home-screen experience 130-*b* from default home-screen experience 130-*a* or to coordinate with a color or fitness peripheral 710). At time $T_3$, when fitness peripheral 710 is disconnected, wearable device 100 may change the home-screen experience back to default home-screen experience 130-*a*, and the hardware can be scaled back to inactive and/or low refresh rates.

Figure 8:
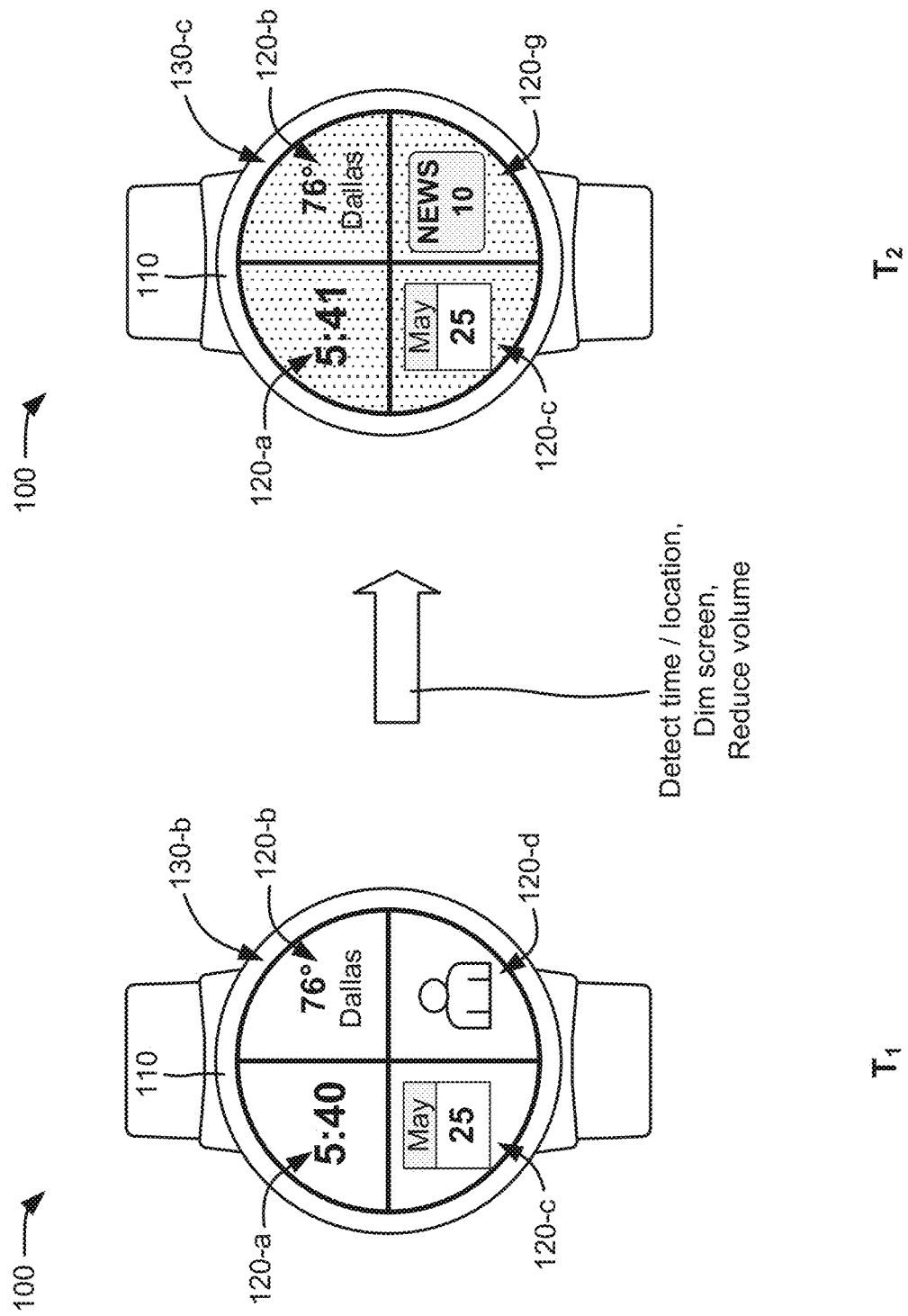

FIG. 8 illustrates another use case for wearable device 100. As shown in FIG. 8, wearable device 100 may switch from a default home-screen experience 130-*a* at a time, $T_1$, to a morning home-screen experience 130-*c* at a particular time of day, $T_2$. Based on detection of time, location, and sensor state data, wearable device 100 may engage a morning use case (e.g., from use cases 572 in contextual engine 570). The morning use case may trigger morning home-screen experience 130-*c* for the user, dim screen brightness, and ensure speaker volume (e.g., speaker 315) is not at a maximum level.

Figure 9:
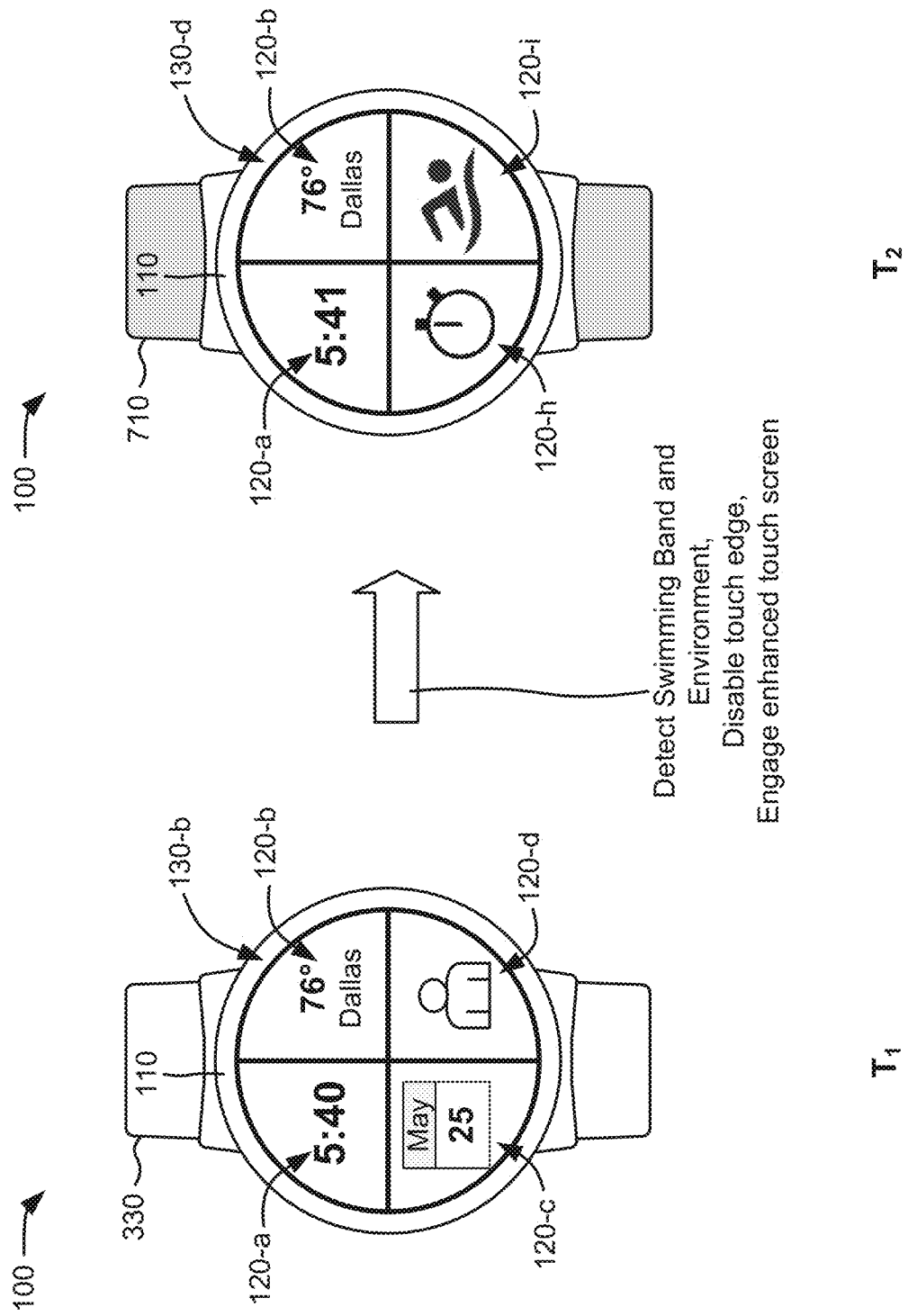

FIG. 9 illustrates still another use case for wearable device 100. As shown in FIG. 9, wearable device 100 may switch from a default home-screen experience 130-*a* at a time, $T_1$, to a swimming home-screen experience 130-*d* at time $T_2$. Wearable device 100 may detect swimming via sensor readings (e.g., barometer and accelerometer readings) when a sport peripheral (e.g., fitness band 710) is connected to wearable device 100. Wearable device 100 (e.g., contextual engine 570) may engage a PPG, enable enhanced touch screen detection for water use, disable touch screen edge detection (e.g., touch-sensitive edge 325), and increases the sensor refresh rates for the accelerometer, gyroscope, and barometer. Wearable device 100 may also present an icon 120-*i* for a swimming application on the home screen.

Figure 10:
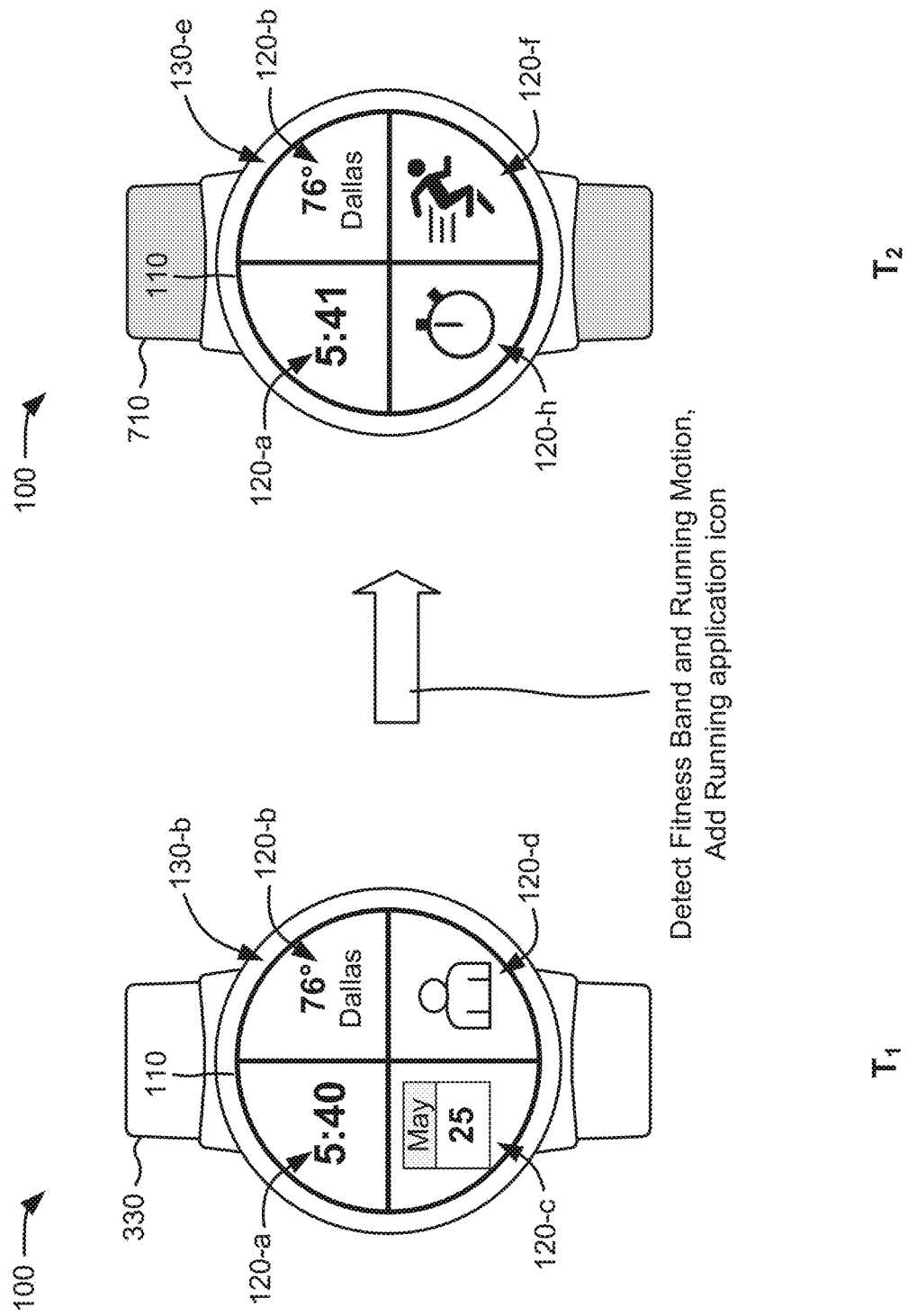

FIG. 10 illustrates yet another use case for wearable device 100. As shown in FIG. 10, wearable device 100 may switch from a default home-screen experience 130-*a* at a time, $T_1$, to a running home-screen experience 130-*e* at time $T_2$. Wearable device 100 may detect running via sensor readings (e.g., accelerometer/pedometer readings) when a sport peripheral (e.g., fitness band 710) is connected to wearable device 100. Wearable device 100 (e.g., contextual engine 570) may engage the PPG and present an icon 120-*i* for a running application on the home screen. Thus, wearable device 100 may provide a seamless experience for the use to access running information when the user did not set up a running session prior to starting to run.

Figure 11:
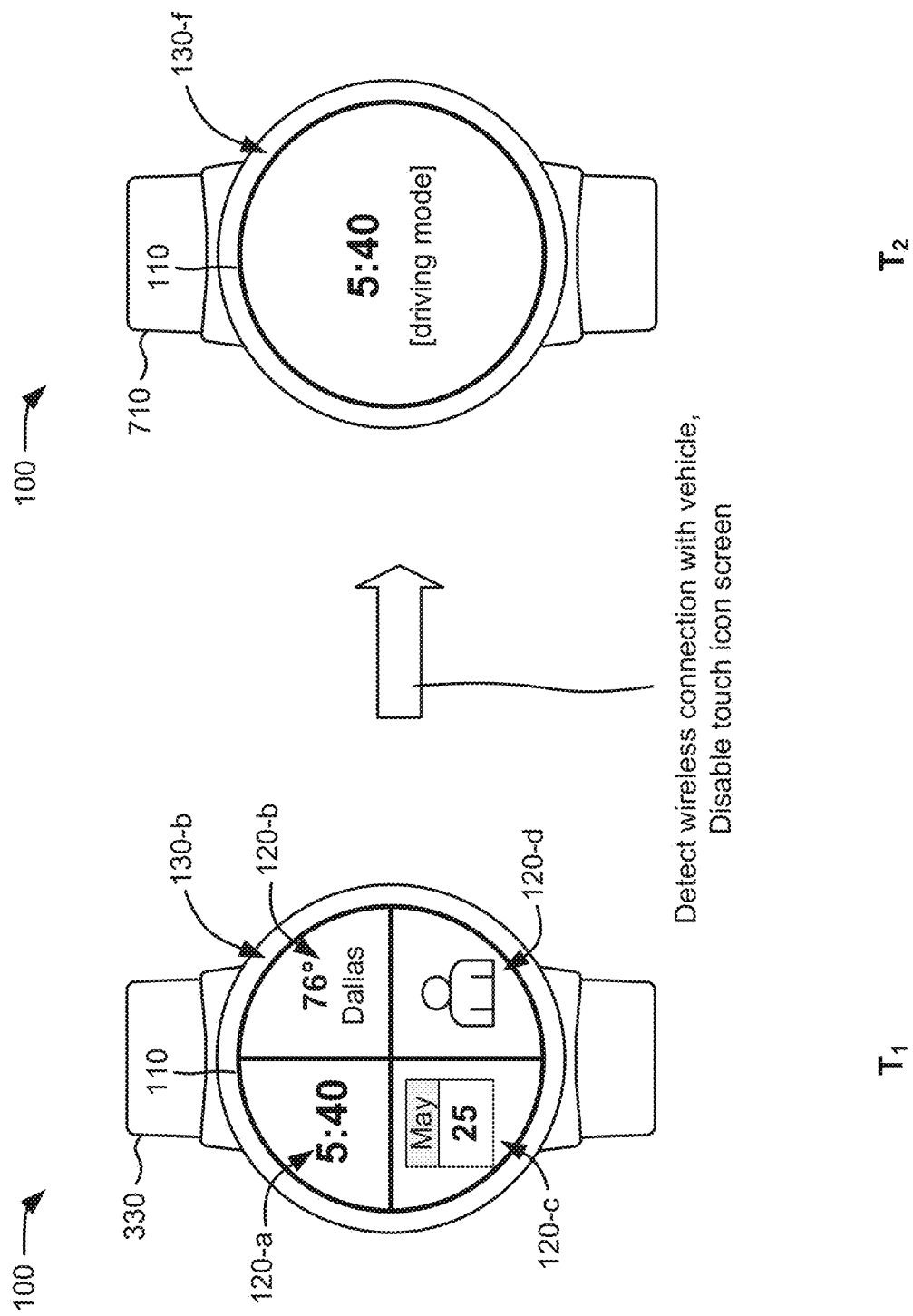

FIG. 11 illustrates another use case for wearable device 100. As shown in FIG. 11, wearable device 100 may switch from a default home-screen experience 130-*a* at a time, $T_1$, to a vehicle home-screen experience 130-*f* at time $T_2$. Wearable device 100 may detect that a user of wearable device 100 is in vehicle via wireless communications (e.g., a Bluetooth connection) with a vehicle computer and/or location (e.g., GPS) readings. Wearable device 100 (e.g., contextual engine 570) may become an interface to the vehicle via a wireless peripheral, changing the home screen from default home-screen experience 130-*a* to vehicle home-screen experience 130-*f*. Wearable device 100 may also implement hardware changes to disable the touch screen (e.g., the capacitive sensors on display 320) and enable the PPG to monitor the users heart-rate while driving.

Figure 12:
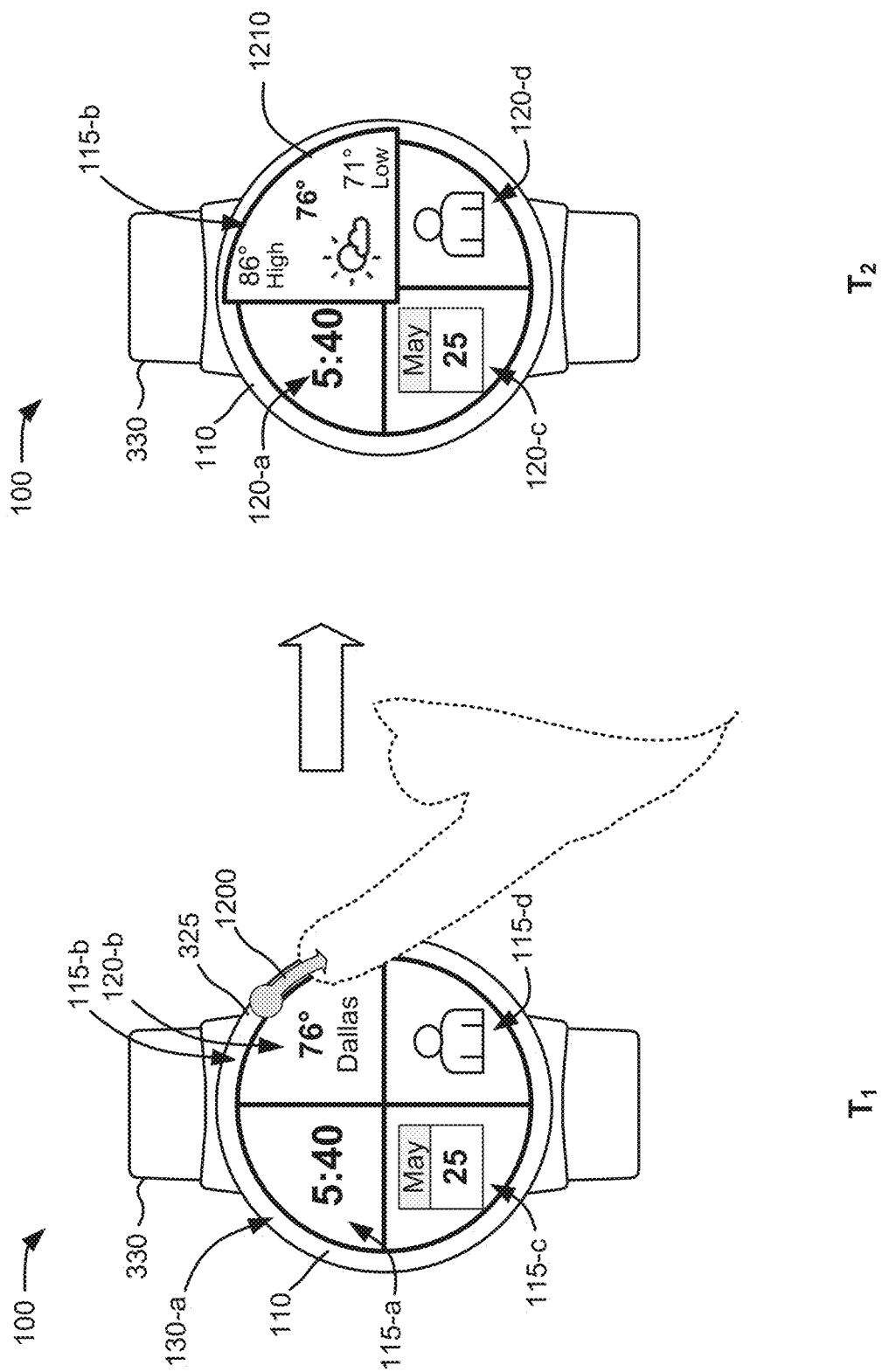

FIG. 12 illustrates another use case for wearable device 100. As shown in FIG. 12, a portion 115-*b* of wearable device 100 may selected from a default home-screen experience 130-*b* at a time, $T_1$, to present application-specific data at time $T_2$. At time $T_1$, wearable device 100 may detect input 1200 (e.g., a sweeping touch motion) along touch-sensitive edge 325 from a user of wearable device 100. Based on user input 1200, wearable device 100 may, at time $T_2$, expand the viewable area of portion 115-*b* to permit presentation of additional data 1210 from the underlying application (e.g., a weather application). Use of touch-sensitive edge 325 to receive a continuous touch motion for user input may prevent inadvertent selection of a portion 115 and may permit better visibility of display screen 110 during the user's selection.

According to an implementation described herein, a wearable device may receive user configuration data that provides user-specific information for stored use cases and generate a personalized use case database. The personalized use case database may be based on the stored use cases and the user-specific information. The wearable device may obtain location data, sensor data, time data, and peripheral state data and detect a meaningful change in a most recent data instance of the obtained location data, sensor data, time data, or peripheral state data relative to an earlier data instance of the obtained location data, sensor data, time data, and peripheral state data. The wearable device may determine if the most recent data instance corresponds to a particular use case in the personalized use case database; present on a display a new home-screen experience, including multiple application user interfaces for the particular use case, when the most recent data instance corresponds to the particular use case; and change a hardware state of the wearable computing device to enable use of the multiple application user interfaces in the new home-screen experience.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 6, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    storing, by a wearable computing device and in a local memory, use case definitions for multiple home-screen experiences for the wearable computing device,
        wherein the wearable computing device includes hardware comprising one or more sensors and a display with at least one of a touch-sensitive panel or a touch-sensitive edge,
        wherein each of the use case definitions identify one of the multiple home-screen experience that indicates a combination of a user display and a hardware configuration for the wearable computing device;
    generating, by the wearable computing device, a personalized use case database, wherein the personalized use case database includes use cases based on the stored use case definitions and user-specific information;
    obtaining, by the wearable computing device, location data, sensor data, time data, and peripheral state data associated with the wearable computing device;
    detecting, by the wearable computing device, a change in a most recent data instance of the obtained location data, sensor data, time data, or peripheral state data relative to an earlier data instance of the obtained location data, sensor data, time data, and peripheral state data, wherein detecting the change includes:
        detecting a connection of a peripheral device to the wearable computing device, and
        detecting a sensor reading corresponding to use of the peripheral device;
    determining, by the wearable computing device and when the change is detected, if the most recent data instance matches a particular use case in the personalized use case database; and
    presenting, by the wearable computing device, a home-screen experience, of the multiple home-screen experiences, that corresponds to the determined use case when the most recent data instance matches the particular use case, wherein the presenting further comprises changing a hardware state of the wearable computing device.

2. The method of claim 1, wherein each of the multiple home-screen experiences includes a display of a different combination of user interface icons in portions of a display screen of the wearable computing device.

3. The method of claim 2, further comprising:
    presenting, by the wearable computing device, a default home-screen experience, of the multiple home-screen experiences, when the most recent data instance does not match a particular use case.

4. The method of claim 2, further comprising:
    presenting, by the wearable computing device, a most recent home-screen experience when the most recent data instance does not correspond to a particular use case.

5. The method of claim 1, wherein changing the hardware state comprises at least one of:
    changing a refresh rate for the one or more sensors,
    enabling or disabling the touch sensitive edge, or
    enabling or disabling enhanced touch screen detection of the touch-sensitive panel.

6. The method of claim 1, wherein obtaining the location data, sensor data, time data, and peripheral state data includes communicating with a user's mobile communication device to obtain the location data, sensor data, time data, or peripheral state data.

7. The method of claim 1, wherein obtaining the location data, sensor data, time data, and peripheral state data includes communicating with the connected peripheral device to obtain the location data, sensor data, time data, or peripheral state data.

8. The method of claim 1, wherein obtaining the location data, sensor data, time data, and peripheral state data includes communicating with one or more of a remote locator system or a remote service provider network to obtain the location data, sensor data, time data, or peripheral state data.

9. The method of claim 1, wherein detecting the change further comprises:
    archiving, in the local memory of the wearable device, the earlier data instance of the location data, sensor data, time data, and peripheral state data;
    receiving the most recent data instance of the location data, sensor data, time data, and peripheral state data;
    comparing the most recent data instance with the earlier data instance; and
    archiving, in the local memory, the most recent data instance.

10. The method of claim 9, the archiving including archiving the earlier data instance with at least ten previous data instances; and the receiving the most recent data instance including receiving the most recent data instance within one second of the earlier data instance.

11. The method of claim 1, wherein at least some of the home-screen experiences, of the multiple home-screen experiences, include data-driven icons which present application data.

12. A wearable device, comprising:
a memory to store a plurality of instructions and multiple applications;
one or more sensors;
a touch-sensitive display including at least one of a touch-sensitive panel or a touch-sensitive edge;
a hardware controller; and
a processor to execute the plurality of instructions to:
store, in the memory, use case definitions for multiple home-screen experiences for the wearable computing device, wherein each of the use case definitions identify one of the multiple home-screen experience that indicates a combination of a user display and a hardware configuration for the wearable computing device;
generate a personalized use case database, wherein the personalized use case database includes use cases based on the stored use case definitions and user-specific information;
obtain location data, sensor data, time data, and peripheral state data associated with the wearable computing device;
detect a change in a most recent data instance of the obtained location data, sensor data, time data, or peripheral state data relative to an earlier data instance of the obtained location data, sensor data, time data, and peripheral state data, wherein detecting the change includes:
detecting a connection of a peripheral device to the wearable computing device, and
detecting a sensor reading corresponding to use of the peripheral device;
determine, when the change is detected, if the most recent data instance matches a particular use case in the personalized use case database; and
present one of the multiple home-screen experiences that corresponds to the determined use case when the most recent data instance matches the particular use case, wherein the presenting further comprises changing a hardware state of the wearable computing device.

13. The wearable device of claim 12, further comprising:
a communication interface to communicate with one or more other peripheral devices that provide the location data, the sensor data, the time data, or the peripheral state data.

14. The wearable device of claim 12, further comprising: one or more anchor points to receive the peripheral device.

15. The wearable device of claim 12, wherein, when changing the hardware state, the processor is further to execute the plurality of instructions to:
enable or disable the touch sensitive edge, or
enable or disable enhanced touch screen detection for underwater use of the touch-sensitive panel.

16. The wearable device of claim 12, wherein, when changing the hardware state, the processor is further to execute the plurality of instructions to:
change a refresh rate for an accelerometer,
change a refresh rate for a gyroscope, or
change a refresh rate for a barometer.

17. The wearable device of claim 12, wherein the processor is further to execute the plurality of instructions to:
archive, in the memory, the earlier data instance and the new data instance.

18. A non-transitory computer-readable medium storing instructions executable by a computational device to:
store, in a memory, use case definitions for multiple home-screen experiences for a wearable computing device, wherein each of the use case definitions identify one of the multiple home-screen experience that indicates a combination of a user display and a hardware configuration for the wearable computing device;
generate a personalized use case database, wherein the personalized use case database includes use cases based on the stored use case definitions and user-specific information;
obtain location data, sensor data, time data, and peripheral state data associated with the wearable computing device;
detect a change in a most recent data instance of the obtained location data, sensor data, time data, or peripheral state data relative to an earlier data instance of the obtained location data, sensor data, time data, and peripheral state data, wherein detecting the change includes:
detecting a connection of a peripheral device to the wearable computing device, and
detecting a sensor reading corresponding to use of the peripheral device;
determine, when the change is detected, if the most recent data instance matches a particular use case in the personalized use case database; and
present one of the multiple home-screen experiences that corresponds to the determined use case when the most recent data instance matches the particular use case, wherein the presenting further comprises changing a hardware state of the wearable computing device.

19. The non-transitory computer-readable medium of claim 18, wherein the instructions to change the hardware state include instructions to:
activate one or more sensors, or
alter the reporting periodicity of the one or more sensors.

20. The non-transitory computer-readable medium of claim 18, wherein the instructions to obtain the location data, sensor data, time data, and peripheral state data include instructions to:
communicate with a mobile communication device to obtain the location data, the sensor data, the time data, or the peripheral state data.

* * * * *